(12) United States Patent
Zhu et al.

(10) Patent No.: US 12,068,828 B2
(45) Date of Patent: Aug. 20, 2024

(54) USER EQUIPMENT BEAM SWEEPING FOR MILLIMETER WAVE

(71) Applicant: QUALCOMM Incorporated, San Diego, CA (US)

(72) Inventors: Jun Zhu, San Diego, CA (US); Kang Gao, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/811,502

(22) Filed: Jul. 8, 2022

(65) Prior Publication Data

US 2024/0014877 A1   Jan. 11, 2024

(51) Int. Cl.
*H04B 7/06* (2006.01)
*H04B 7/08* (2006.01)
*H04B 17/309* (2015.01)
*H04W 16/28* (2009.01)

(52) U.S. Cl.
CPC ........... *H04B 7/0695* (2013.01); *H04B 7/088* (2013.01); *H04B 17/309* (2015.01); *H04W 16/28* (2013.01)

(58) Field of Classification Search
CPC .... H04B 7/0695; H04B 17/309; H04B 7/088; H04W 16/28
See application file for complete search history.

(56) References Cited

U.S. PATENT DOCUMENTS

2022/0061123 A1* 2/2022 Liu ........................ H04B 7/08
2022/0286189 A1* 9/2022 Svendsen ............. H04B 7/0617

* cited by examiner

*Primary Examiner* — Jaison Joseph
(74) *Attorney, Agent, or Firm* — Procopio, Cory, Hargreaves & Savitch LLP

(57) ABSTRACT

An apparatus (e.g., a UE) may be configured to configure a plurality of orthogonal scrambling codes corresponding to a plurality of antenna panels of the UE and perform, for a first SSB transmission, a beam sweeping operation over a set of first beams for each antenna panel in the plurality of antenna panels, where, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

30 Claims, 9 Drawing Sheets

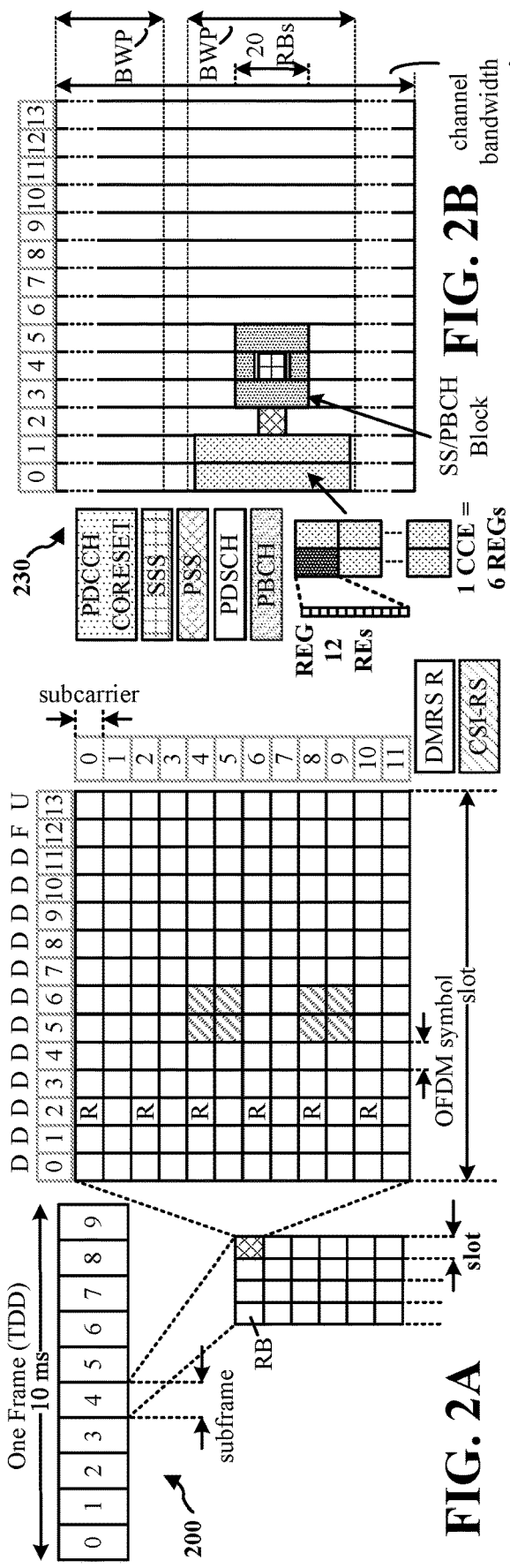
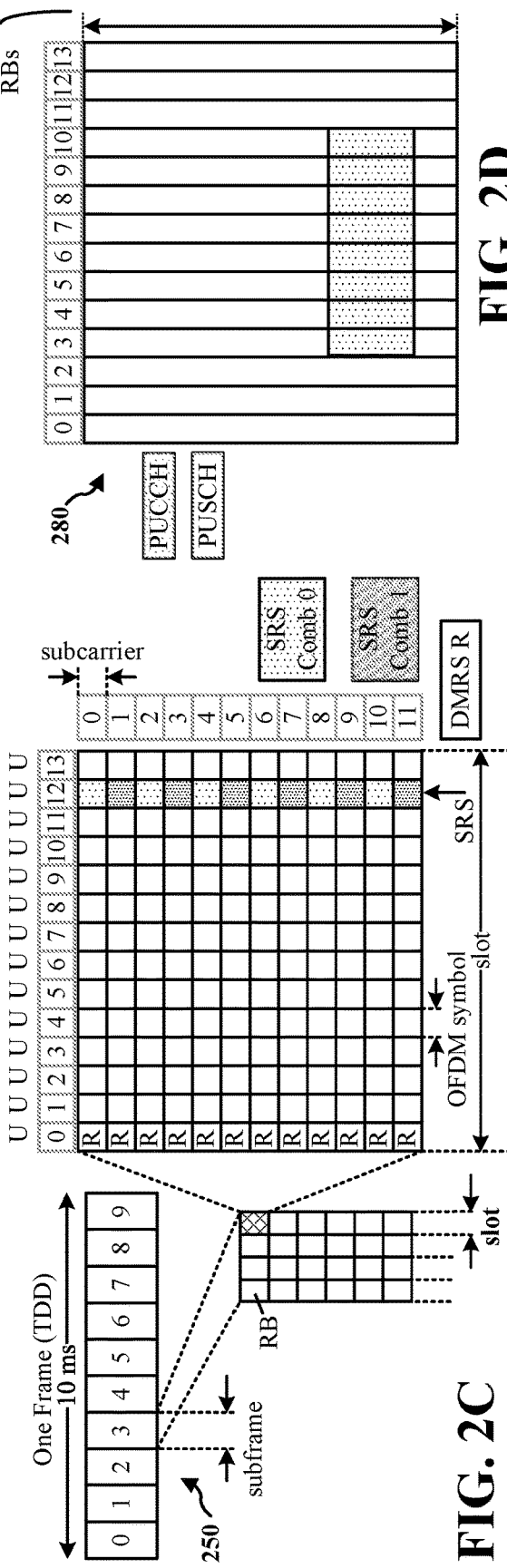
FIG. 2A
FIG. 2B
FIG. 2C
FIG. 2D

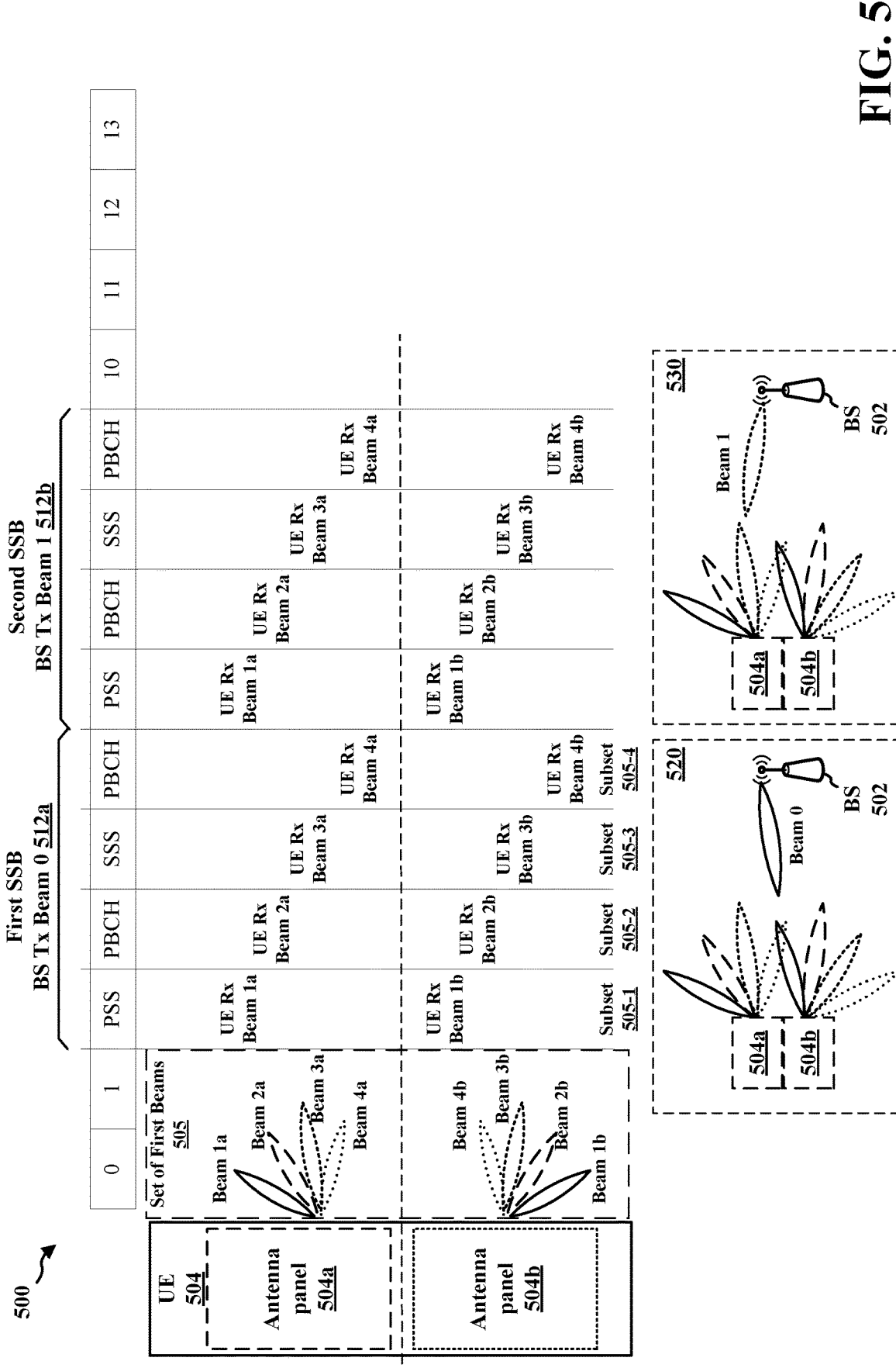

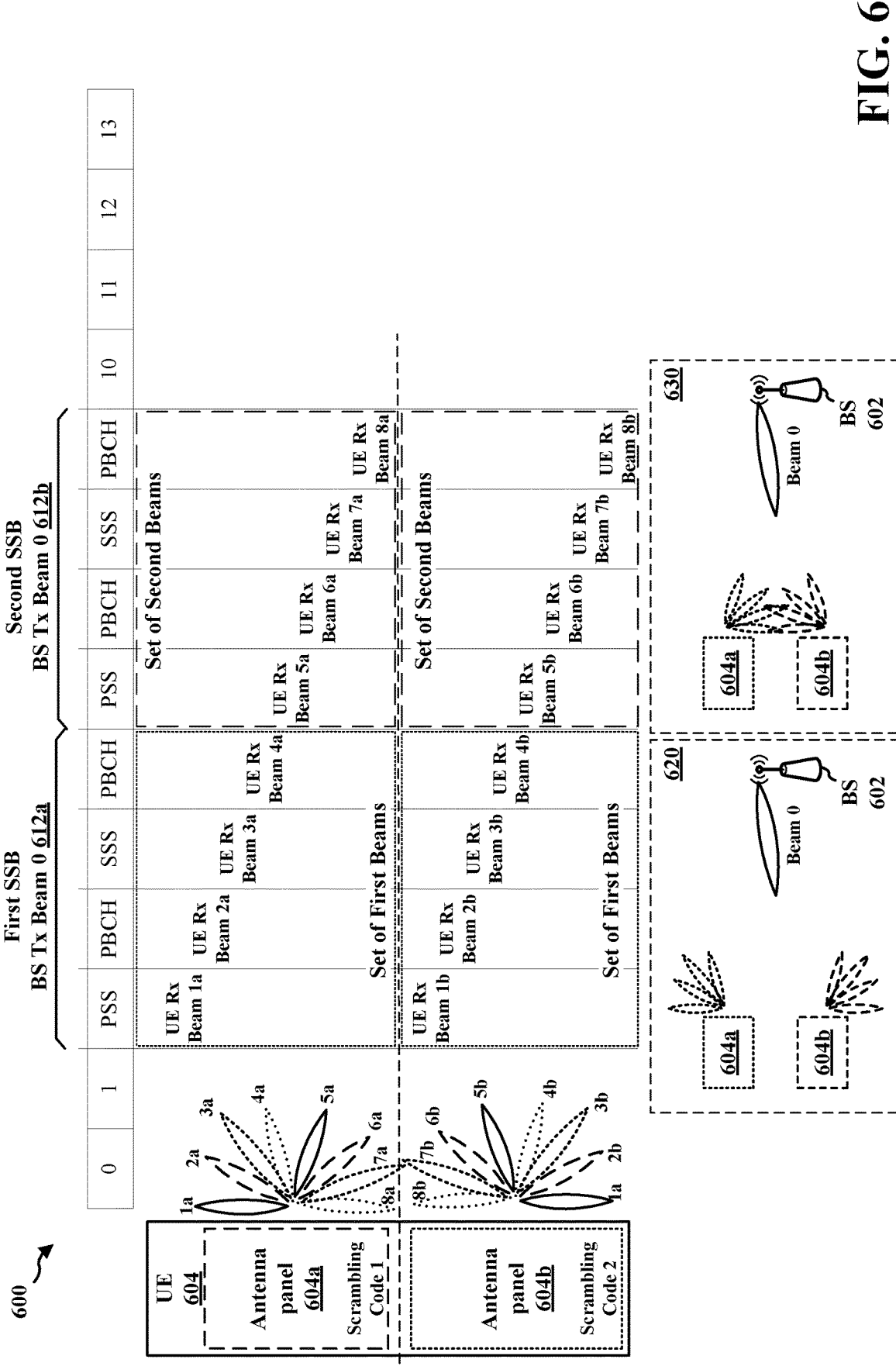

FIG. 7

702 — configure a plurality of orthogonal scrambling codes corresponding to a plurality of antenna panels of the UE 706 — perform, for a first SSB transmission, a beam sweeping operation over a set of first beams at each antenna panel in the plurality of antenna panels — each antenna panel in the plurality of antenna panels receiving a transmitted first signal via a beam in the set of first beams using an orthogonal scrambling code in the plurality of orthogonal scrambling codes corresponding to the antenna panel

700

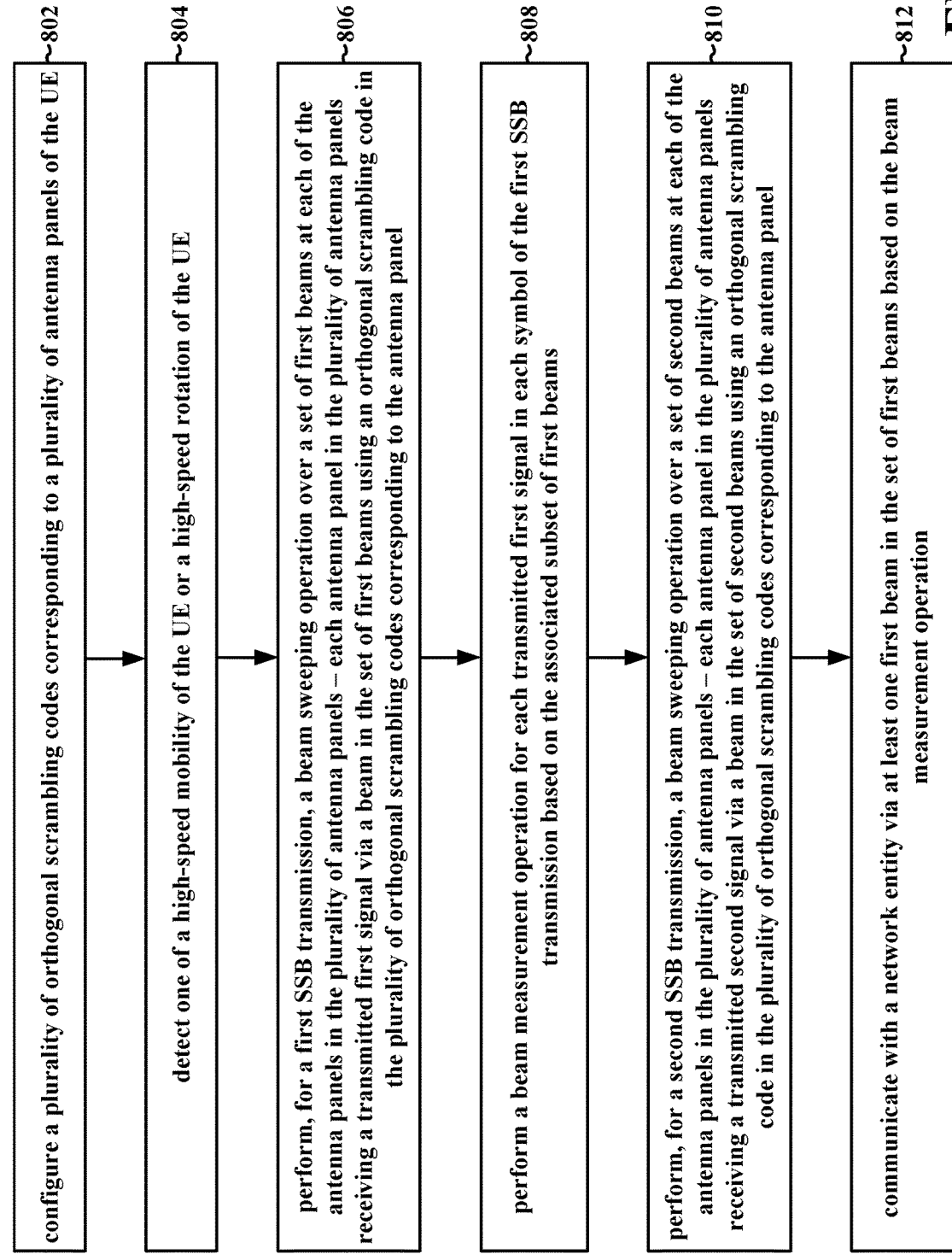

USER EQUIPMENT BEAM SWEEPING FOR MILLIMETER WAVE

TECHNICAL FIELD

The present disclosure relates generally to communication systems, and more particularly, to a beam sweeping operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to configure a plurality of orthogonal scrambling codes corresponding to a plurality of antenna panels of a user equipment (UE) and perform, for a first synchronization signal block (SSB) transmission, a beam sweeping operation over a set of first beams for each antenna panel in the plurality of antenna panels, where, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIG. 5 includes a first diagram, a second diagram, and a third diagram illustrating a first UE including a pair of antenna panels receiving components of a first and second SSB via different pairs of receive beams and transmission beam at the different antenna panels.

FIG. 6 includes a first diagram, a second diagram, and a third diagram illustrating a first UE including a pair of antenna panels receiving components of a first and second SSB via different receive beams (and a same transmit beam) at the different antenna panels.

FIG. 7 is a flowchart of a method of wireless communication.

FIG. 8 is a flowchart of a method of wireless communication.

DETAILED DESCRIPTION

Figure 1:
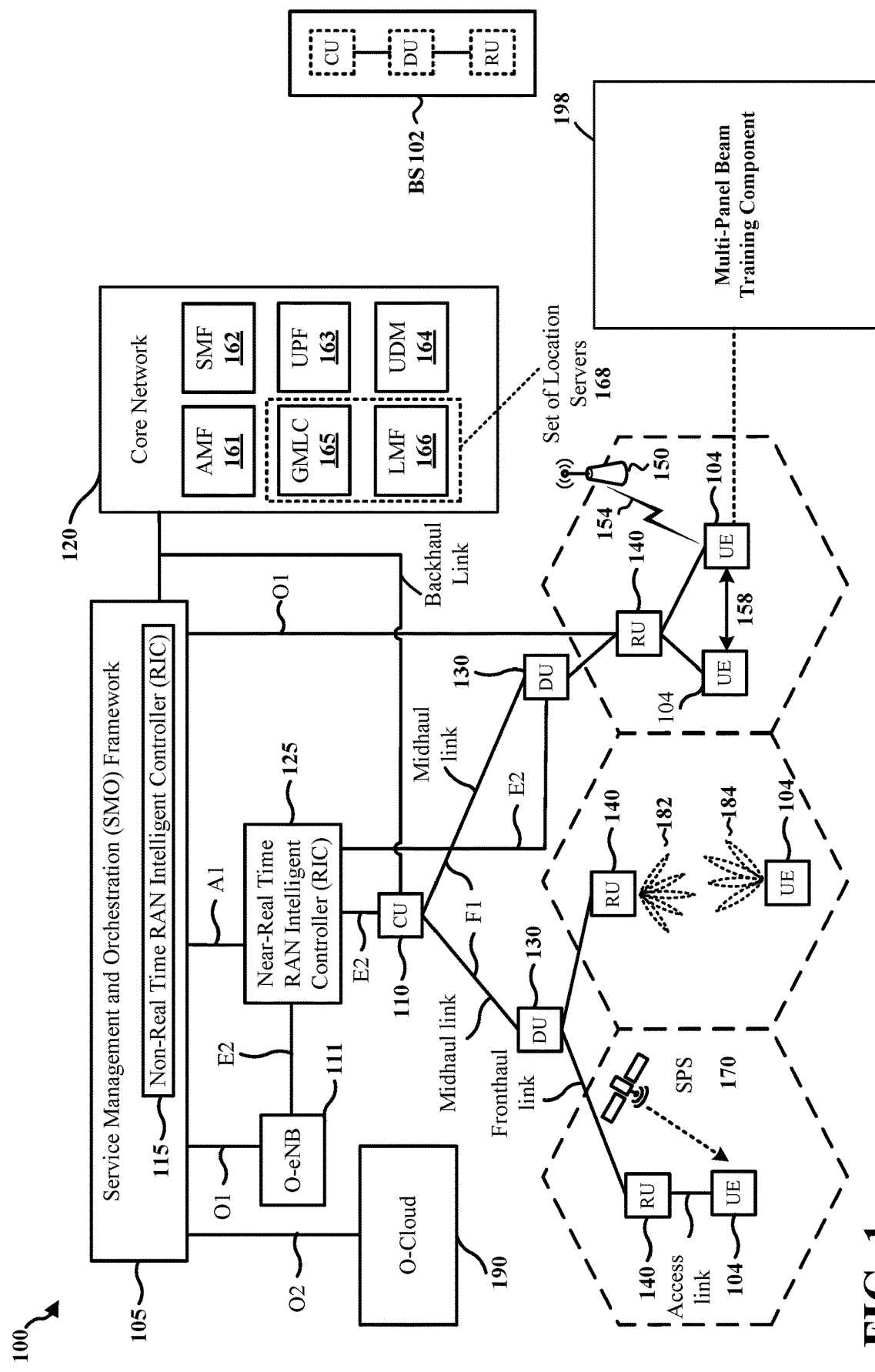
FIG. 1 is a diagram illustrating an example of a wireless communications system and an access network.

In some aspects of wireless communication, a pair of wireless devices (e.g., a pair of base stations, a pair of UEs, or a base station and a UE) may perform a beamforming operation in order to select a beam pair for communication. The beamforming operation, in some aspects, may include one or more of a beam sweeping operation, a beam measurement operation, a beam determination operation, and a beam reporting operation.

The beam sweeping operation may include one or more of the wireless devices "sweeping" a set of beams (e.g., beams generated by beamforming multiple antenna resources to achieve a spatial direction and a spatial breadth/width of energy for transmitting or receiving wireless communications). Sweeping the set of beams may include using each of a set of beams that cover a physical space to transmit and/or receive a transmission (e.g., a SSB or sounding reference signal (SRS)). The set of beams may include beams at different levels of a beam hierarchy, where a lowest level of beam includes a set of one or more broadest beams, and each higher level of the beam hierarchy includes beams that are narrower than a 'parent' beam at a lower level of the hierarchy that spatially contain the 'child' beam at the higher level. In some aspects, codebook-based beamforming relies on a pre-designed and/or configured finite dictionary of UE beams with each beam labeled by a "level" in the hierarchy that indicates its width. For example, a UE codebook associated with each antenna panel in a set of one or more antenna panels may include a first lowest level (L1) beam (e.g., a widest beam), seven second-level (L2) beams, and eight third-level (L3) beams (e.g., a set of narrowest beams), such that a device with two antenna panels may be associated with 32 beams.

In some aspects, a transmitting wireless device may repeat a transmission via a particular beam during a beam sweeping operation to allow the receiving device to sweep the set of receive beams for the particular transmission beam. For example, a set of SSBs may be transmitted periodically (e.g., every 20 ms) with each SSB in the set of SSBs being transmitted with a different beam and received with a same beam within the set of SSBs but different for each periodic transmission of the set of SSBs such that each pair of transmit beam and receive beam is used for the beam sweeping operation.

The beam sweeping operation may be associated with a beam measurement operation for each beam pair explored/swept in the beam sweeping operation. The beam measurement operation may include measuring a signal strength (e.g., based on a signal-to-noise ratio (SNR), a signal to interference plus noise ratio (SINR), a reference signal received power (RSRP), a reference signal received quality (RSRQ), or other appropriate measure). Based on the measured signal strength, the wireless device (e.g., the UE) may perform a beam determination operation that includes identifying a best beam pair and determining to use the identified beam pair. After determining the beam pair to use the wireless device (e.g., the UE) may report the determined beam pair to the other wireless device (e.g., the base station). Based on the beam reporting, the pair of wireless devices may begin communicating via the determined beam pair.

As spatially directional beams (both base station and UE) may be sensitive to mobility, the UE may perform a beam tracking utilizing a similar beam sweeping operation. However, in a high mobility environment and/or situation (e.g., moving at high speed or at a high angular speed, such as 180 degrees/second) a beam sweeping operation that spans many transmissions of the set of SSB to complete may be obsolete before it is complete. Accordingly, an innovative method for a timely (shorter duration) completion of a beam sweeping operation is presented herein.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an Al interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as Al policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub -6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/ UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a multi-panel beam training component 198 that may be configured to configure a plurality of orthogonal scrambling codes corresponding to a plurality of antenna panels of the UE and perform, for a first SSB transmission, a beam sweeping operation over a set of first beams for each antenna panel in the plurality of antenna panels, where, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
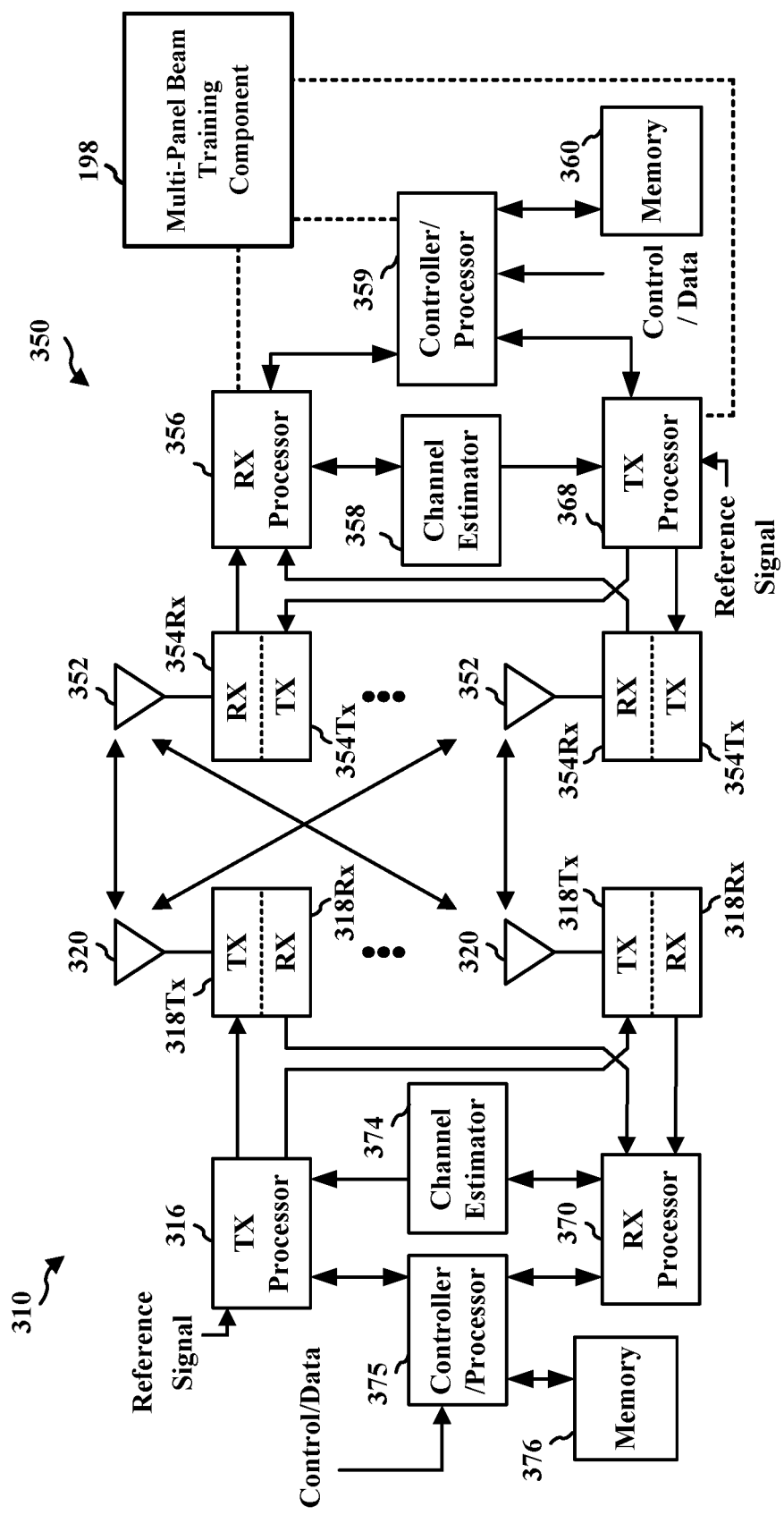
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression / decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase- shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the multi-panel beam training component 198 of FIG. 1.

In some aspects of wireless communication, a pair of wireless devices (e.g., a pair of base stations, a pair of UEs, or a base station and a UE) may perform a beamforming operation in order to select a beam pair for communication. The beamforming operation, in some aspects, may include one or more of a beam sweeping operation, a beam measurement operation, a beam determination operation, and a beam reporting operation.

The beam sweeping operation may include one or more of the wireless devices "sweeping" a set of beams (e.g., beams generated by beamforming multiple antenna resources to achieve a spatial direction and a spatial breadth/width of energy for transmitting or receiving wireless communications). Sweeping the set of beams may include using each of a set of beams that cover a physical space to transmit and/or receive a transmission (e.g., a synchronization signal block (SSB) or sounding reference signal (SRS)). The set of beams may include beams at different levels of a beam hierarchy, where a lowest level of beam includes a set of one or more broadest beams, and each higher level of the beam hierarchy includes beams that are narrower than a 'parent' beam at a lower level of the hierarchy that spatially contain the 'child' beam at the higher level. In some aspects, codebook-based beamforming relies on a pre-designed and/or configured finite dictionary of UE beams with each beam labeled by a "level" in the hierarchy that indicates its width. For example, a UE codebook associated with each antenna panel in a set of one or more antenna panels may include a first lowest level (L1) beam (e.g., a widest beam), seven second-level (L2) beams, and eight third-level (L3) beams (e.g., a set of narrowest beams), such that a device with two antenna panels may be associated with 32 beams.

The hierarchy of beams in some aspects, may be used to perform a first beam sweeping operation based on the L1 beam to determine a first beam direction at the first (lowest) level and then to perform subsequent beam sweeping operations to refine the beam direction based on the L2 beams and then further refine the beam direction based on the L3 beams. When using the full hierarchy, in some aspects, the UE may require at least one beam sweeping operation for each beam level in the hierarchy to determine a best (e.g., most suitable) beam.

In some aspects, a transmitting wireless device may repeat a transmission via a particular beam during a beam sweeping operation to allow the receiving device to sweep the set of receive beams for the particular transmission beam. For example, a set of SSBs may be transmitted periodically (e.g., every 20 ms) with each SSB in the set of SSBs being transmitted with a different beam and received with a same beam within the set of SSBs but different for each periodic transmission of the set of SSBs such that each pair of transmit (Tx) beam and receive (Rx) beam is used for the beam sweeping operation.

The beam sweeping operation may be associated with a beam measurement operation for each beam pair explored/swept in the beam sweeping operation. The beam measurement operation may include measuring a signal strength (e.g., based on SNR, SINR, RSRP, RSRQ, or other appropriate measure). Based on the measured signal strength, the wireless device (e.g., the UE) may perform a beam determination operation that includes identifying a best (e.g., most suitable) beam pair and determining to use the identified beam pair. After determining the beam pair to use the wireless device (e.g., the UE) may report the determined beam pair to the other wireless device (e.g., the base station). Based on the beam reporting, the pair of wireless devices may begin communicating via the determined beam pair.

As spatially directional beams (both base station and UE) may be sensitive to mobility, the UE may perform a beam tracking utilizing a similar beam sweeping operation. However, in a high mobility environment and/or situation (e.g., moving at high speed or at a high angular speed, such as 180 degrees/second) a beam sweeping operation that spans many transmissions of the set of SSB to complete may be obsolete before it is complete. Accordingly, an innovative method for a timely (shorter duration) completion of a beam sweeping operation is presented herein.

Figure 4:
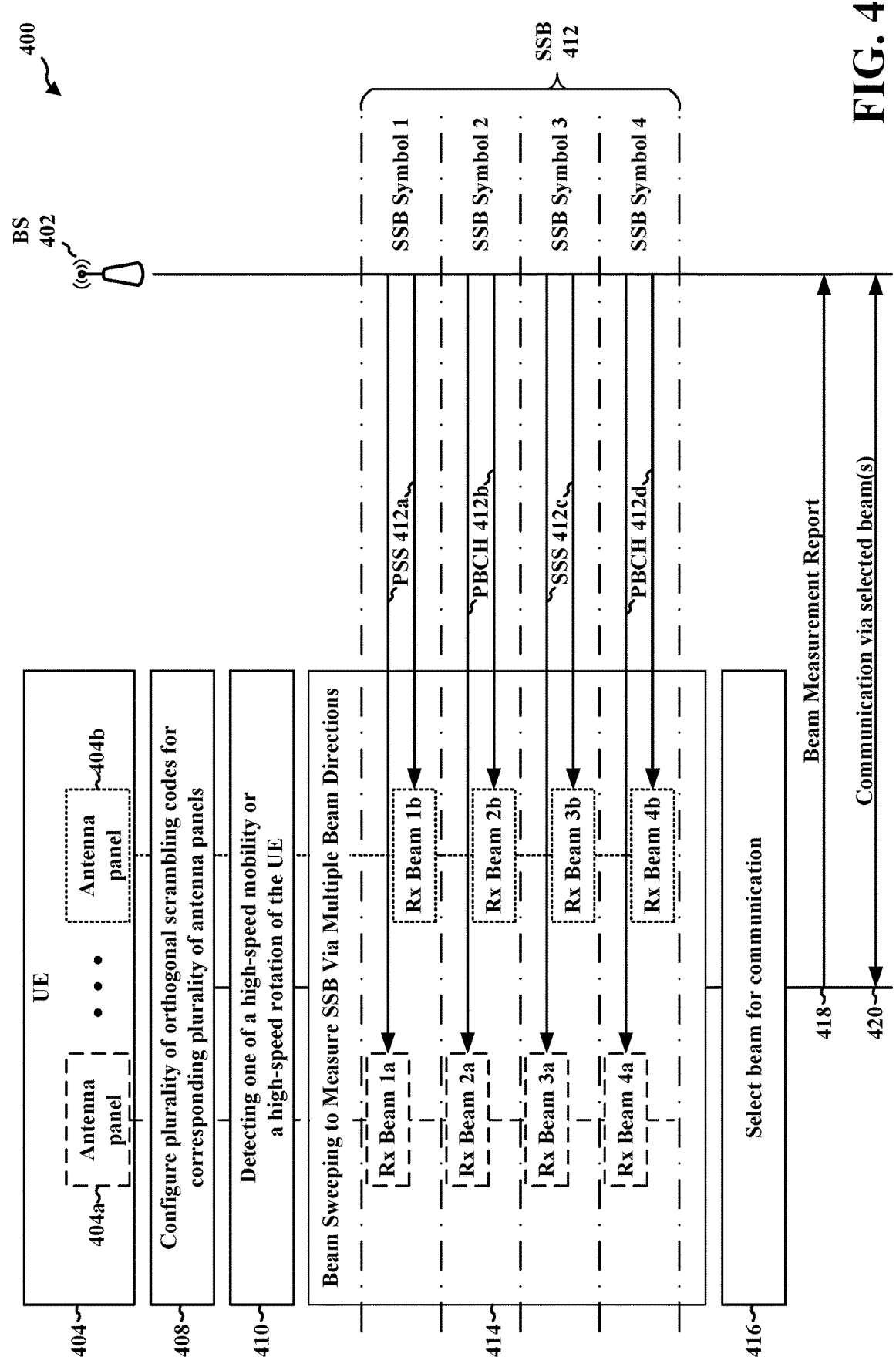
FIG. 4 is a call flow diagram of a method of wireless communication in accordance with some aspects of the disclosure.

FIG. 4 is a call flow diagram 400 of a method of wireless communication in accordance with some aspects of the disclosure. FIG. 4 illustrates a UE 404 (as an example of a wireless device) performing a beam training operation with a base station 402 (e.g., as an example of a network node). The UE 404 may include multiple antenna panels (e.g., radio frequency integrated circuits (RFICs)) such as antenna panel 404a and antenna panel 404b. In some aspects, the UE 404 may include more than two antenna panels that function as described below in relation to antenna panels 404a and 404b.

At 408, the UE 404 may configure a plurality of orthogonal scrambling codes for the plurality of antenna panels 404a to 404b. Each scrambling code may be associated with a particular antenna panel (e.g., 404a or 404b). Each antenna panel may apply an associated scrambling code to a received signal such that the received signal from each antenna panel may be recovered by a baseband processor (not shown) of the UE, e.g., by a digital processing. The number, and format, of the scrambling codes may be based on the number of antenna panels. For example, for a set of four antenna panels some aspects may use scrambling codes that are at least two bits long such that four different scrambling codes may be generated. In other aspects, a larger number of bits, e.g., a number of bits equal to the number of antenna panels, may be used for the scrambling codes. The scrambling codes, in some aspects, may be known or pre-configured (e.g., by a manufacturer). For example, each antenna panel may be associated with a different (orthogonal) Gold sequence that may be used to distinguish signals received by one antenna panel from signals received by a different antenna panel.

In some aspects, the use of the scrambling codes allows for the UE 404 to receive a same signal (e.g., PSS 412a, PBCH 412b, SSS 412c, or PBCH 412d) at multiple antenna panels 404a to 404b, separate the signals received by each antenna panel (using a particular beam direction), and measure a signal strength associated with each of the different antenna panels (and the beam direction they used to receive the signal). This allows, in some aspects, the UE 404 to sweep (e.g., measure a signal strength of) multiple beams simultaneously, where the number of beams may be equal to, or lesser than, the number of antenna panels. However, using multiple antenna panels simultaneously, in some aspects, may consume too much power and may be overkill for a low mobility application and/or environment.

The UE 404, at 410, may detect one of a high-speed mobility, or a high-speed rotation, of the UE 404. For example, in some aspects, a high-speed mobility may be detected based on a doppler shift threshold (e.g., greater than 2 KHz) while a high-speed rotation may be based on a rotation speed threshold (e.g., greater than 30 deg/sec). The specific threshold values may change, in some aspects, based on a current application.

Based on detecting the high speed mobility of the UE 404, the UE 404 may perform a beam sweeping operation at 414. The beam sweeping operation performed at 414 may be based on, or associated with, a transmission of a SSB 412 from the base station 402. The SSB 412 may include a first signal (e.g., PSS 412a) during a first symbol, a second signal (e.g., PBCH 412b) during a second symbol, a third signal (e.g., SSS 412c) during a third symbol, and a fourth signal (e.g., PBCH 412d) during a fourth symbol. Each signal may be received by each antenna panel using a different receive beam (e.g., one of receive beam 1a, receive beam 2a, receive beam 3a, or receive beam 4a for antenna panel 404a, and one of receive beam 1b, receive beam 2bb, receive beam 3b, or receive beam 4b for antenna panel 404bb).

The UE, at 414, may further measure, e.g., in a beam measurement operation, a signal strength of the SSB 412 for each signal in each symbol in the SSB 412 at each antenna panel 404a to 404b. For example, for a PSS 412a transmitted during a first symbol of the SSB 412, the antenna panel 404a may use a receive beam 1a and a first orthogonal scrambling code while the antenna panel 404b may use a receive beam 1b and a second orthogonal scrambling code such that the same transmitted signal is received using a number of beams equal to the number of antenna panels. The baseband processor of the UE may recover the (separate) received signals for a signal power (or signal quality) measurement. Measuring the signal strength, at 414, of the SSB 412 may include measuring one or more of a SNR, a SINR, a RSRP, a RSRQ, or other appropriate measure.

Similarly, for the first SSB 412, a PBCH 412b, a SSS 412c, and a PBCH 412d may be transmitted during a second symbol, a third symbol, and a fourth symbol, respectively. For the PBCH 412b, the SSS 412c, and the PBCH 412d the antenna panel 404a may use the first orthogonal scrambling code and a receive beam 2a, a receive beam 3a, and a receive beam 4a, respectively, while the antenna panel 404b may use the second orthogonal scrambling code and the receive beam 2b, a receive beam 3b, and a receive beam 4b, respectively, such that the same transmitted signal is received using a number of beams equal to the number of antenna panels. As described above, the baseband processor of the UE may recover (separate) the received signals for a signal power (or signal quality) measurement (e.g., SNR, SINR, RSRP, or RSRQ).

Using the method described in relation to the beam sweeping operation 414 (and the associated beam measurement operation), in some aspects, provides faster beam sweeping over a set of beams. In some aspects, the receive beams 1a to 4a and 1b to 4b (e.g., a set of first beams) may be a set of level 3 (L3) beams or a set of high level beams. In some aspects, the set of high level beams is associated with a highest level in a hierarchy of beam levels. The set of first beams (and a set of second beams as illustrated in FIG. 5 below), in some aspects, do not include any beams at levels in the hierarchy of beams that are below the highest level. In some aspects, by sweeping the highest level (e.g., narrowest) beams, complexities relating to identifying parent and child beams for beam refinement can be avoided. Additionally, because there may be hand-blockage of beams at the device, by directly measuring the narrowest beam, the best beam in the presence of the hand blockage may be identified instead of first identifying a best lower level beam merely to discover that the associated higher level beams suffer from hand blockage that reduces the signal strength.

The operations 414 and 416 described in relation to a first SSB 412, in some aspects, may be repeated to cover a full set of beam directions at the highest level (e.g., L3) in the hierarchy of beam levels. For example, if eight (or sixteen) beam directions are included (or defined) at the highest level (e.g., L3) of the hierarchy of beam levels for each antenna panel, two (or four) sets of beam sweeping and beam measurement operations similar to the beam sweeping and measurement operations 414 and 416 may be performed to sweep the full set of beam directions.

FIG. 5 includes a first diagram 500, a second diagram 520, and a third diagram 530 illustrating a first UE 504 including a pair of antenna panels (e.g., a first antenna panel 504a and a second antenna panel 504b) receiving components of a first and second SSB via different pairs of receive beams (e.g., a set of first beams 505) and transmission beams at the different antenna panels. Diagrams 500 and 520 illustrate that, in some aspects, a first SSB 512a transmitted via a base station transmission beam 0 may be received by a set of first beams (e.g., beam 1a to beam 4a of antenna panel 504a and beam 1b to beam 4b of antenna panel 504b) as described in relation to the reception and measurement operation performed at 414 and associated with SSB 412 of FIG. 4. The set of first beams may include a subset of first beams associated with each symbol of the SSB (e.g., subset 505-1, subset 505-2, subset 505-3, and subset 505-4 associated with a first, second, third, and fourth symbol of the SSB, respectively). Diagrams 500 and 530 illustrate that, in some aspects, a second SSB 512b transmitted via a base station transmission beam 1 may be received by the set of first beams (e.g., beam 1a to beam 4a of antenna panel 504a and beam 1b to beam 4b of antenna panel 504b). Additional transmission beams associated with a base station 502 may be swept in a similar manner until the entire set of spatial beam pairs is explored and/or measured. FIG. 5 illustrates a set of 4 receive beams associated with each antenna panel of UE 504 such that the entire set of 4 beams may be swept within one SSB transmission. For example, referring to FIG. 2B, a SSB may include the transmission of PSS, PBCH, SSS, and PBCH, in symbols 2-5 of a DL slot. In some aspects, an additional SSB transmission may be transmitted within a same slot using an adjacent set of symbols (e.g., symbols 6-9) or after a set of gap symbols (an SSB transmitted in symbols 9-12 with gap symbols 6-8).

FIG. 6 includes a first diagram 600, a second diagram 620, and a third diagram 630 illustrating a first UE 604 including a pair of antenna panels (e.g., a first antenna panel 604a and a second antenna panel 604b) receiving components of a first and second SSB via different receive beams (and a same transmit beam) at the different antenna panels. Diagrams 600 and 620 illustrate that, in some aspects, a first SSB 612a transmitted via a base station transmission beam 0 may be received by a set of first beams (e.g., beam 1a to beam 4a of the first antenna panel 604a and beam 1b to beam 4b of the second antenna panel 604b) as described in relation to the reception and measurement operation performed at 414 and associated with SSB 412 of FIG. 4. Diagrams 600 and 630 illustrate that, in some aspects, a second SSB 612b transmitted via the same base station transmission beam 0 may be received by a set of second beams (e.g., beam 5a to beam 8a of the first antenna panel 604a and beam 5b to beam 8b of the second antenna panel 604b).

As illustrated, a base station 602 may repeat a transmission of a SSB using a same transmit beam to provide enough measurement opportunities to sweep all the receive beams at the UE 604. Additional transmission beams associated with the base station 602 may be transmitted similarly to a first SSB 512a and a second SSB 512b for base station transmission beam 0 until the entire set of spatial beam pairs is explored and/or measured. Additional antenna panels may be used in some aspects. Each additional antenna panel, in some aspects, provides the ability to measure one additional receive beam direction in each symbol of a SSB transmission.

After the beam sweeping operation and beam measurement operation performed at 414 (e.g., as illustrated in one of FIGS. 5 and 6), the UE 404 may select, at 416, at least one first beam in the set of first beams (or, in some aspects, at least one second beam in the set of second beams) based on the beam measurement operation performed at 414. The UE 404 may also select, at 416, a transmit beam for the base station 402. Based on the selection performed at 416, the UE 404 may transmit a beam measurement report 418. The beam measurement report 418, in some aspects, may identify the selected at least one first beam and the selected transmit beam. The UE 404 may then transmit and/or receive communication 420 via the selected beams.

FIG. 7 is a flowchart 700 of a method of wireless communication. The method may be performed by a UE (e.g., the UE 104, 404, 504, or 604; the apparatus 904). At 702, the UE may configure a plurality of orthogonal scrambling codes corresponding to a plurality of antenna panels of the UE. For example, 702 may be performed by application processor 906, cellular baseband processor 924, or multi-panel beam training component 198. The plurality of orthogonal scrambling codes, in some aspects, includes a plurality of multiple bit (multi-bit) scrambling codes. The plurality of antenna panels, in some aspects, includes a first number of antenna panels and the plurality of multi-bit scrambling codes includes scrambling codes with a second number of bits, where the second number of bits is greater than, or equal to, the first number of antenna panels. As described above in relation to FIG. 4, the orthogonal scrambling codes may be used to recover (separate) signals received from each of the plurality of antenna panels to perform a beam measurement operation. For example, referring to FIGS. 4-6, each antenna panel in a group of antenna panels (e.g., antenna panels 404a to 404b, antenna panels 504a and 504b, antenna panels 604a and 604b) may be associated with a different orthogonal scrambling code (e.g., scrambling code 1 for antenna pane 1604a and scrambling code 2 for antenna panel 604b).

The UE may detect one of a high-speed mobility of the UE or a high-speed rotation of the UE. In some aspects, detecting one of the high-speed mobility of the UE or the high-speed rotation of the UE is based on a sensor of the UE measuring a value for one of a mobility of the UE or a rotation of the UE that is above a threshold value. For example, referring to FIG. 4, the UE 404 may detect, at 410, one of the high-speed mobility of the UE or the high-speed rotation of the UE.

Based on detecting one of the high-speed mobility of the UE or the high-speed rotation of the UE, the UE may, at 706, perform, for a first SSB transmission, a beam sweeping operation over a set of first beams at each antenna panel in the plurality of antenna panels. In some aspects, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel. For example, 706 may be performed by application processor 906, transceiver(s) 922, antennas(s) 980, or multi-panel beam training component 198. In some aspects, the set of first beams corresponds to a set of level 3 (L3) beams or a set of high level beams, where the set of high level beams is associated with a highest level in a hierarchy of beam levels. The set of first beams, in some aspects, may include a set of beams at a highest level in a hierarchy of beams, where the set of beams at the highest level is a set of narrowest beams in the hierarchy of beams. In some aspects, the set of first beams does not include beams at levels in the hierarchy of beams that are below the highest level.

In some aspects, a first beam in the set of first beams used to receive the transmitted first signal in a first symbol of the first SSB transmission by a first antenna panel in the plurality of antenna panels is different from a second beam in the set of first beams used to receive the transmitted first signal in the first symbol of the first SSB transmission at a second antenna panel in the plurality of antenna panels. In some aspects, the set of first beams includes a subset of the set of first beams associated with each symbol of the first SSB transmission. For example, referring to FIGS. 4-6, the UE 404 may perform a beam sweeping operation over a set of first beams (Rx beams 1a to 4a and 1b to 4b) at 414 as illustrated in FIGS. 5 and 6 where each subset of the set of first beams (e.g., subset 505-1 to 505-4) is swept during a corresponding symbol (e.g., the PSS symbol, the PBCH symbol, the SSS symbol, and the PBCH symbol of the first SSB 512a, respectively).

The UE, in some aspects, may also perform a beam measurement operation for each transmitted first signal in each symbol of the first SSB transmission based on the associated subset of first beams. The measurements may be used, in some aspects, to select a beam pair for subsequent communication. For example, referring to FIGS. 4-6, the UE 404, 504, or 604 may perform a beam measurement operation at 414 to measure, for each beam in the set of first beams 505 a signal strength associated with the SSB in each symbol of the SSB based on a subset of the set of first beams (e.g., subsets 505-1 to 505-4). The UE 404 may then select, at 416, a particular beam pair for subsequent communications with the base station 402.

The UE, in some aspects, may additionally perform, for a second SSB transmission, a second beam sweeping operation over a set of second beams at each antenna panel in the plurality of antenna panels. In some aspects, for a transmitted second signal in each symbol of the second SSB transmission, each antenna panel in the plurality of antenna panels receives the transmitted second signal via a beam in the set of second beams using the orthogonal scrambling code in the plurality of orthogonal scrambling codes corresponding to the antenna panel. In some aspects, the beam sweeping operation for the second SSB transmission is similar to the beam sweeping operation at 704. In some aspects, the set of second beams corresponds to a set of level 3 (L3) beams or a set of high level beams, where the set of high level beams is associated with a highest level in a hierarchy of beam levels. The set of second beams, in some aspects, may include a set of beams at a highest level in a hierarchy of beams, where the set of beams at the highest level is a set of narrowest beams in the hierarchy of beams. In some aspects, the set of second beams does not include beams at levels in the hierarchy of beams that are below the highest level.

In some aspects, a first beam in the set of second beams used to receive the transmitted first signal in a first symbol of the second SSB transmission by a first antenna panel in the plurality of antenna panels is different from a second beam in the set of second beams used to receive the transmitted first signal in the first symbol of the second SSB transmission at a second antenna panel in the plurality of antenna panels. In some aspects, the set of second beams includes a subset of the set of second beams associated with each symbol of the second SSB transmission. For example, referring to FIG. 6, the UE 604 may perform a beam sweeping operation over a set of second beams (Rx beams 5a to 8a or 5b to 8b) where each subset of the set of second beams is swept during a corresponding symbol (e.g., the PSS symbol, the PBCH symbol, the SSS symbol, and the PBCH symbol of the second SSB 612b, respectively).

Finally, the UE, in some aspects, may communicate with a network entity via at least one first beam in the set of first beams based on the beam measurement operation. The communication may be based on a selected beam or beam pair as described. For example, referring to FIG. 4, the UE 404 may select, at 416 at least one beam in the set of first beams and transmit and/or receive the communication 420 via the selected beam(s).

FIG. 8 is a flowchart 800 of a method of wireless communication. The method may be performed by a UE (e.g., the UE 104, 404, 504, or 604; the apparatus 904). At 802, the UE may configure a plurality of orthogonal scrambling codes corresponding to a plurality of antenna panels of the UE. For example, 802 may be performed by application processor 906, cellular baseband processor 924, or multi-panel beam training component 198. The plurality of orthogonal scrambling codes, in some aspects, includes a plurality of multi-bit scrambling codes. The plurality of antenna panels, in some aspects, includes a first number of antenna panels and the plurality of multi-bit scrambling codes includes scrambling codes with a second number of bits, where the second number of bits is greater than, or equal to, the first number of antenna panels. As described above in relation to FIG. 4, the orthogonal scrambling codes may be used to recover (separate) signals received from each of the plurality of antenna panels to perform a beam measurement operation. For example, referring to FIGS. 4-6, each antenna panel in a group of antenna panels (e.g., antenna panels 404a to 404b, antenna panels 504a and 504b, antenna panels 604a and 604b) may be associated with a different orthogonal scrambling code.

At 804, the UE may detect one of a high-speed mobility of the UE or a high-speed rotation of the UE. For example, 804 may be performed by application processor 906, one or more sensor modules 918, or multi-panel beam training component 198. In some aspects, detecting, at 804, one of the high-speed mobility of the UE or the high-speed rotation of the UE is based on a sensor of the UE measuring a value for one of a mobility of the UE or a rotation of the UE that is above a threshold value. For example, referring to FIG. 4, the UE 404 may detect, at 410, one of the high-speed mobility of the UE or the high-speed rotation of the UE.

Based on detecting, at 804, one of the high-speed mobility of the UE or the high-speed rotation of the UE, the UE may, at 806, perform, for a first SSB transmission, a beam sweeping operation over a set of first beams at each of the antenna panels in the plurality of antenna panels. In some aspects, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel. For example, 806 may be performed by application processor 906, transceiver(s) 922, antennas(s) 980, or multi-panel beam training component 198. In some aspects, the set of first beams corresponds to a set of level 3 (L3) beams or a set of high level beams, where the set of high level beams is associated with a highest level in a hierarchy of beam levels. The set of first beams, in some aspects, may include a set of beams at a highest level in a hierarchy of beams, where the set of beams at the highest level is a set of narrowest beams in the hierarchy of beams. In some aspects, the set of first beams does not include beams at levels in the hierarchy of beams that are below the highest level.

In some aspects, a first beam in the set of first beams used to receive a transmitted first signal in a first symbol of the first SSB transmission by a first antenna panel in the plurality of antenna panels is different from a second beam in the set of first beams used to receive the transmitted first signal in the first symbol of the first SSB transmission at a second antenna panel in the plurality of antenna panels. In some aspects, the set of first beams includes a subset of the set of first beams associated with each symbol of the first SSB transmission. For example, referring to FIGS. 4-6, the UE 404 may perform a beam sweeping operation over a set of first beams (Rx beams 1a to 4a and 1b to 4b) at 414 as illustrated in FIGS. 5 and 6 where each subset of the set of first beams (e.g., subset 505-1 to 505-4) is swept during a corresponding symbol (e.g., the PSS symbol, the PBCH symbol, the SSS symbol, and the PBCH symbol of the first SSB 512a, respectively).

At 808, the UE may perform a beam measurement operation for each transmitted first signal in each symbol of the first SSB transmission based on the associated subset of first beams. For example, 808 may be performed by application processor 906, or multi-panel beam training component 198. The measurements may be used, in some aspects, to select a beam pair for subsequent communication. For example, referring to FIGS. 4-6, the UE 404, 504, or 604 may perform a beam measurement operation at 414 to measure, for each beam in the set of first beams 505 a signal strength associated with the SSB in each symbol of the SSB based on a subset of the set of first beams (e.g., subsets 505-1 to 505-4). The UE 404 may then select, at 416, a particular beam pair for subsequent communications with the base station 402.

At 810, the UE may perform, for a second SSB transmission, a second beam sweeping operation over a set of second beams at each antenna panel in the plurality of antenna panels. In some aspects, for a transmitted second signal in each symbol of the second SSB transmission, each antenna panel in the plurality of antenna panels receives the transmitted second signal via a beam in the set of second beams using the orthogonal scrambling code in the plurality of orthogonal scrambling codes corresponding to the antenna panel. For example, 810 may be performed by application processor 906, transceiver(s) 922, antennas(s) 980, or multi-panel beam training component 198. In some aspects, the beam sweeping operation at 810 is similar to the beam sweeping operation at 806. In some aspects, the set of second beams corresponds to a set of level 3 (L3) beams or a set of high level beams, where the set of high level beams is associated with a highest level in a hierarchy of beam levels. The set of second beams, in some aspects, may include a set of beams at a highest level in a hierarchy of beams, where the set of beams at the highest level is a set of narrowest beams in the hierarchy of beams. In some aspects, the set of second beams does not include beams at levels in the hierarchy of beams that are below the highest level.

In some aspects, a first beam in the set of second beams used to receive a transmitted first signal in a first symbol of the second SSB transmission by a first antenna panel in the plurality of antenna panels is different from a second beam in the set of second beams used to receive the transmitted first signal in the first symbol of the second SSB transmission at a second antenna panel in the plurality of antenna panels. In some aspects, the set of second beams includes a subset of the set of second beams associated with each symbol of the second SSB transmission. For example, referring to FIG. 6, the UE 604 may perform a beam sweeping operation over a set of second beams (Rx beams 5a to 8a or 5b to 8b) where each subset of the set of second beams is swept during a corresponding symbol (e.g., the PSS symbol, the PBCH symbol, the SSS symbol, and the PBCH symbol of the second SSB 612b, respectively).

Finally, at 812, the UE may communicate with a network entity via at least one first beam in the set of first beams based on the beam measurement operation. For example, 812 may be performed by application processor 906, transceiver(s) 922, antennas(s) 980, or multi-panel beam training component 198. The communication may be based on a selected beam or beam pair as described. For example, referring to FIG. 4, the UE 404 may select, at 416 at least one beam in the set of first beams and transmit and/or receive the communication 420 via the selected beam(s).

Figure 9:
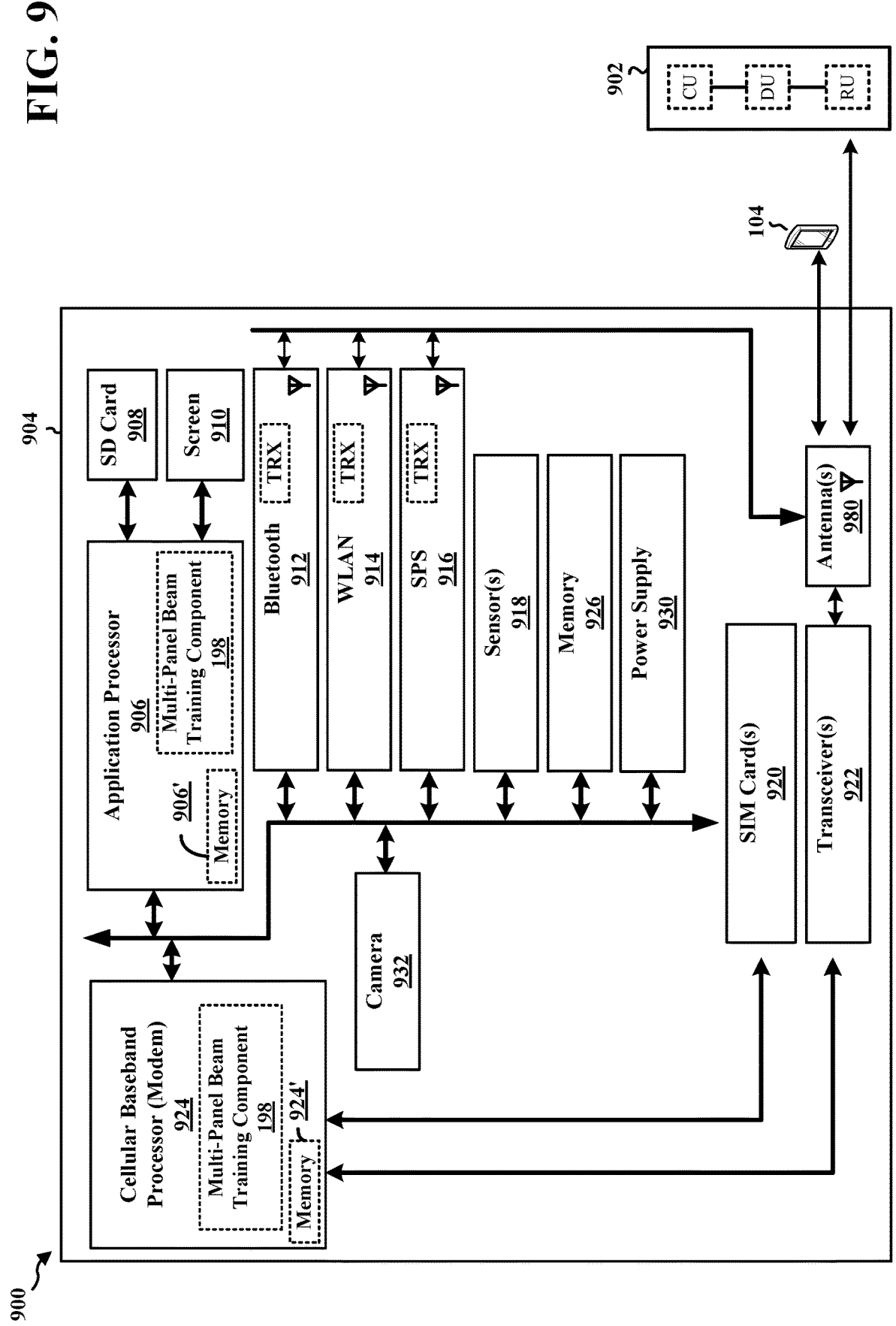
FIG. 9 is a diagram illustrating an example of a hardware implementation for an apparatus.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SO-NAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed supra, the multi-panel beam training component 198 is configured to configure a plurality of orthogonal scrambling codes corresponding to a plurality of antenna panels of the UE. The multi-panel beam training component 198 is further configured to perform, for a first SSB transmission, a beam sweeping operation over a set of first beams for each antenna panel in the plurality of antenna panels, where, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel. The multi-panel beam training component 198 may be within the cellular baseband processor 924, the application processor 906, or both the cellular baseband processor 924 and the application processor 906. The multi-panel beam training component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, includes means for configuring a plurality of orthogonal scrambling codes corresponding to a plurality of antenna panels of the UE. The apparatus 904 may further include means for performing, for a first SSB transmission, a beam sweeping operation over a set of first beams for each antenna panel in the plurality of antenna panels, where, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel. The apparatus 904 may further include means for performing a beam measurement operation for each transmitted first signal in each symbol of the first SSB transmission based on the associated subset of first beams. The apparatus 904 may further include means for communicating with a network entity via at least one first beam in the set of first beams based on the beam measurement operation. The apparatus 904 may further include means for performing, for a second SSB transmission, a second beam sweeping operation over a set of second beams at each antenna panel in the plurality of antenna panels, where, for a transmitted second signal in each symbol of the second SSB transmission, each antenna panel in the plurality of antenna panels receives the transmitted second signal via a beam in the set of first beams using the orthogonal scrambling code in the plurality of orthogonal scrambling codes corresponding to the antenna panel. The apparatus 904 may further include means for detecting one of a high-speed mobility of the UE or a high-speed rotation of the UE, where performing the beam sweeping operation is based on detecting one of the high-speed mobility of the UE or the high-speed rotation of the UE. The means may be the multi-panel beam training component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

In some aspects of wireless communication, a pair of wireless devices (e.g., a pair of base stations, a pair of UEs, or a base station and a UE) may perform a beamforming operation in order to select a beam pair for communication. The beamforming operation, in some aspects, may include one or more of a beam sweeping operation, a beam measurement operation, a beam determination operation, and a beam reporting operation.

The beam sweeping operation may include one or more of the wireless devices "sweeping" a set of beams (e.g., beams generated by beamforming multiple antenna resources to achieve a spatial direction and a spatial breadth/width of energy for transmitting or receiving wireless communications). Sweeping the set of beams may include using each of a set of beams that cover a physical space to transmit and/or receive a transmission (e.g., a SSB or SRS). The set of beams may include beams at different levels of a beam hierarchy, where a lowest level of beam includes a set of one or more broadest beams, and each higher level of the beam hierarchy includes beams that are narrower than a 'parent' beam at a lower level of the hierarchy that spatially contain the 'child' beam at the higher level. In some aspects, codebook-based beamforming relies on a pre-designed and/or configured finite dictionary of UE beams with each beam labeled by a "level" in the hierarchy that indicates its width. For example, a UE codebook associated with each antenna panel in a set of one or more antenna panels may include a first L1 beam (e.g., a widest beam), seven L2 beams, and eight L3 beams (e.g., a set of narrowest beams), such that a device with two antenna panels may be associated with 32 beams.

In some aspects, a transmitting wireless device may repeat a transmission via a particular beam during a beam sweeping operation to allow the receiving device to sweep the set of receive beams for the particular transmission beam. For example, a set of SSBs may be transmitted periodically (e.g., every 20 ms) with each SSB in the set of SSBs being transmitted with a different beam and received with a same beam within the set of SSBs but different for each periodic transmission of the set of SSBs such that each pair of transmit beam and receive beam is used for the beam sweeping operation.

The beam sweeping operation may be associated with a beam measurement operation for each beam pair explored/swept in the beam sweeping operation. The beam measurement operation may include measuring a signal strength (e.g., based on a SNR, a SINR, a RSRP, a RSRQ, or other appropriate measure). Based on the measured signal strength, the wireless device (e.g., the UE) may perform a beam determination operation that includes identifying a best beam pair and determining to use the identified beam pair. After determining the beam pair to use the wireless device (e.g., the UE) may report the determined beam pair to the other wireless device (e.g., the base station). Based on the beam reporting, the pair of wireless devices may begin communicating via the determined beam pair.

As spatially directional beams (both base station and UE) may be sensitive to mobility, the UE may perform a beam tracking utilizing a similar beam sweeping operation. However, in a high mobility environment and/or situation (e.g., moving at high speed or at a high angular speed, such as 180 degrees/second) a beam sweeping operation that spans many transmissions of the set of SSB to complete may be obsolete before it is complete. Accordingly, an innovative method for a timely (shorter duration) completion of a beam sweeping operation is presented herein.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including configuring a plurality of orthogonal scrambling codes corresponding to a plurality of antenna panels of the UE and performing, for a first SSB transmission, a beam sweeping operation over a set of first beams for each antenna panel in the plurality of antenna panels, where, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

Aspect 2 is the method of aspect 1, where a first beam in the set of first beams used to receive the transmitted first signal in a first symbol of the first SSB transmission by a first antenna panel in the plurality of antenna panels is different from a second beam in the set of first beams used to receive the transmitted first signal in the first symbol of the first SSB transmission at a second antenna panel in the plurality of antenna panels.

Aspect 3 is the method of aspect 2, where the set of first beams includes a subset of the set of first beams associated with each symbol of the first SSB transmission, the method further including performing a beam measurement operation for each transmitted first signal in each symbol of the first SSB transmission based on the associated subset of first beams.

Aspect 4 is the method of aspect 3, further including communicating with a network entity via at least one first beam in the set of first beams based on the beam measurement operation.

Aspect 5 is the method of any of aspects 1 to 4, where the set of first beams corresponds to a set of L3 beams or a set of high level beams, where the set of high level beams is associated with a highest level in a hierarchy of beam levels.

Aspect 6 is the method of any of aspects 1 to 5, where each antenna panel in the plurality of antenna panels includes an RFIC.

Aspect 7 is the method of any of aspects 1 to 6, where the plurality of orthogonal scrambling codes includes a plurality of multi-bit scrambling codes.

Aspect 8 is the method of aspect 7, where the plurality of antenna panels includes a first number of antenna panels and the plurality of multi-bit scrambling codes includes scrambling codes with a second number of bits, where the second number of bits is greater than or equal to the first number of antenna panels.

Aspect 9 is the method of any of aspects 1 to 8, further including performing, for a second SSB transmission, a beam sweeping operation over a set of second beams at each of the antenna panels in the plurality of antenna panels, where, for a transmitted second signal in each symbol of the second SSB transmission, each antenna panel in the plurality of antenna panels receives the transmitted second signal via a beam in the set of second beams using an orthogonal scrambling code in the plurality of orthogonal scrambling codes corresponding to the antenna panel.

Aspect 10 is the method of aspect 9, where the set of first beams and the set of second beams include a set of beams at a highest level in a hierarchy of beams, where the set of beams at the highest level is a set of narrowest beams in the hierarchy of beams.

Aspect 11 is the method of aspect 10, the set of first beams and the set of second beams do not include any beams at levels in the hierarchy of beams that are below the highest level.

Aspect 12 is the method of any of aspects 1 to 11, further including detecting one of a high-speed mobility of the UE or a high-speed rotation of the UE, where performing the beam sweeping operation is based on detecting one of the high-speed mobility of the UE or the high-speed rotation of the UE.

Aspect 13 is the method of aspect 12, where detecting one of the high-speed mobility of the UE or the high-speed rotation of the UE is based on a sensor of the UE measuring a value for one of a mobility of the UE or a rotation of the UE that is above a threshold value.

Aspect 14 is an apparatus for wireless communication at a UE including a memory and at least one processor coupled to the memory and, based at least in part on information stored in the memory, the at least one processor is configured to implement any of aspects 1 to 13.

Aspect 15 is the method of aspect 14, further including a transceiver or an antenna coupled to the at least one processor.

Aspect 16 is an apparatus for wireless communication at a UE including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

What is claimed is:

1. An apparatus for wireless communication at a user equipment (UE), comprising:
   one or more memories; and
   one or more processors coupled to the one or more memories and, based at least in part on information stored in the one or more memories, the one or more processors are configured to:
   configure a plurality of orthogonal scrambling codes corresponding to a plurality of antenna panels of the UE; and
   perform, for a first synchronization signal block (SSB) transmission, a beam sweeping operation over a set of first beams for each antenna panel in the plurality of antenna panels, wherein, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

2. The apparatus of claim 1, wherein a first beam in the set of first beams used to receive the transmitted first signal in a first symbol of the first SSB transmission by a first antenna panel in the plurality of antenna panels is different from a second beam in the set of first beams used to receive the transmitted first signal in the first symbol of the first SSB transmission at a second antenna panel in the plurality of antenna panels.

3. The apparatus of claim 2, wherein the set of first beams comprises a subset of the set of first beams associated with each symbol of the first SSB transmission, the one or more processors further configured to:
   perform a beam measurement operation for each transmitted first signal in each symbol of the first SSB transmission based on the associated subset of the set of first beams.

4. The apparatus of claim 3, the one or more processors being further configured to:
   communicate with a network entity via at least one first beam in the set of first beams based on the beam measurement operation.

5. The apparatus of claim 1, wherein the set of first beams corresponds to a set of level 3 (L3) beams or a set of high level beams, wherein the set of high level beams is associated with a highest level in a hierarchy of beam levels.

6. The apparatus of claim 1, wherein each antenna panel in the plurality of antenna panels comprises a radio frequency integrated circuit (RFIC).

7. The apparatus of claim 1, wherein the plurality of orthogonal scrambling codes comprises a plurality of multiple bit (multi-bit) scrambling codes.

8. The apparatus of claim 7, wherein the plurality of antenna panels comprises a first number of antenna panels and the plurality of multi-bit scrambling codes comprises scrambling codes with a second number of bits, wherein the second number of bits is greater than or equal to the first number of antenna panels.

9. The apparatus of claim 1, the one or more processors being further configured to:
   perform, for a second SSB transmission, a second beam sweeping operation over a set of second beams at each antenna panel in the plurality of antenna panels, wherein, for a transmitted second signal in each symbol of the second SSB transmission, each antenna panel in the plurality of antenna panels receives the transmitted second signal via a beam in the set of second beams using the orthogonal scrambling code in the plurality of orthogonal scrambling codes corresponding to the antenna panel.

10. The apparatus of claim 9, wherein the set of first beams and the set of second beams comprise a set of beams at a highest level in a hierarchy of beams, wherein the set of beams at the highest level is a set of narrowest beams in the hierarchy of beams.

11. The apparatus of claim 10, wherein the set of first beams and the set of second beams do not comprise any beams at levels in the hierarchy of beams that are below the highest level.

12. The apparatus of claim 1, the one or more processors being further configured to:
   detect one of a high-speed mobility of the UE or a high-speed rotation of the UE, wherein performing the beam sweeping operation is based on detecting one of the high-speed mobility of the UE or the high-speed rotation of the UE.

13. The apparatus of claim 12, further comprising a transceiver coupled to the one or more processors, wherein detecting one of the high-speed mobility of the UE or the high-speed rotation of the UE is based on a sensor of the UE measuring a value for one of a mobility of the UE or a rotation of the UE that is above a threshold value.

14. A method of wireless communication at a user equipment (UE), comprising:
   configuring a plurality of orthogonal scrambling codes corresponding to a plurality of antenna panels of the UE; and
   performing, for a first synchronization signal block (SSB) transmission, a beam sweeping operation over a set of first beams for each antenna panel in the plurality of antenna panels, wherein, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

15. The method of claim 14, wherein a first beam in the set of first beams used to receive the transmitted first signal in a first symbol of the first SSB transmission by a first antenna panel in the plurality of antenna panels is different from a second beam in the set of first beams used to receive the transmitted first signal in the first symbol of the first SSB transmission at a second antenna panel in the plurality of antenna panels.

16. The method of claim 15, wherein the set of first beams comprises a subset of the set of first beams associated with each symbol of the first SSB transmission, the method further comprising:
   performing a beam measurement operation for each transmitted first signal in each symbol of the first SSB transmission based on the associated subset of the set of first beams.

17. The method of claim 16, further comprising:
   communicating with a network entity via at least one first beam in the set of first beams based on the beam measurement operation.

18. The method of claim 14, wherein the set of first beams corresponds to a set of level 3 (L3) beams or a set of high level beams, wherein the set of high level beams is associated with a highest level in a hierarchy of beam levels.

19. The method of claim 14, wherein each antenna panel in the plurality of antenna panels comprises a radio frequency integrated circuit (RFIC).

20. The method of claim 14, wherein the plurality of orthogonal scrambling codes comprises a plurality of multiple bit (multi-bit) scrambling codes.

21. The method of claim 20, wherein the plurality of antenna panels comprises a first number of antenna panels and the plurality of multi-bit scrambling codes comprises scrambling codes with a second number of bits, wherein the second number of bits is greater than or equal to the first number of antenna panels.

22. The method of claim 14, further comprising:
performing, for a second SSB transmission, a second beam sweeping operation over a set of second beams at each antenna panel in the plurality of antenna panels, wherein, for a transmitted second signal in each symbol of the second SSB transmission, each antenna panel in the plurality of antenna panels receives the transmitted second signal via a beam in the set of second beams using the orthogonal scrambling code in the plurality of orthogonal scrambling codes corresponding to the antenna panel.

23. The method of claim 22, wherein the set of first beams and the set of second beams comprise a set of beams at a highest level in a hierarchy of beams, wherein the set of beams at the highest level is a set of narrowest beams in the hierarchy of beams.

24. The method of claim 23, wherein the set of first beams and the set of second beams do not comprise any beams at levels in the hierarchy of beams that are below the highest level.

25. The method of claim 14, further comprising:
detecting one of a high-speed mobility of the UE or a high-speed rotation of the UE, wherein performing the beam sweeping operation is based on detecting one of the high-speed mobility of the UE or the high-speed rotation of the UE.

26. The method of claim 25, wherein detecting one of the high-speed mobility of the UE or the high-speed rotation of the UE is based on a sensor of the UE measuring a value for one of a mobility of the UE or a rotation of the UE that is above a threshold value.

27. An apparatus for wireless communication at a user equipment (UE), comprising:
means for configuring a plurality of orthogonal scrambling codes corresponding to a plurality of antenna panels of the UE; and
means for performing, for a first synchronization signal block (SSB) transmission, a beam sweeping operation over a set of first beams for each antenna panel in the plurality of antenna panels, wherein, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

28. The apparatus of claim 27, wherein the set of first beams comprises a subset of the set of first beams associated with each symbol of the first SSB transmission, the apparatus further comprising:
means for performing a beam measurement operation for each transmitted first signal in each symbol of the first SSB transmission based on the associated subset of the set of first beams; and
means for communicating with a network entity via at least one first beam in the set of first beams based on the beam measurement operation.

29. A non-transitory computer-readable medium storing computer executable code at a user equipment (UE), the code when executed by a processor causes the processor to:
configure a plurality of orthogonal scrambling codes corresponding to a plurality of antenna panels of the UE; and
perform, for a first synchronization signal block (SSB) transmission, a beam sweeping operation over a set of first beams for each antenna panel in the plurality of antenna panels, wherein, for a transmitted first signal in each symbol of the first SSB transmission, each antenna panel in the plurality of antenna panels receives the transmitted first signal via a beam in the set of first beams using an orthogonal scrambling code in the plurality of orthogonal scrambling codes corresponding to the antenna panel.

30. The non-transitory computer-readable medium of claim 29, wherein the set of first beams comprises a subset of the set of first beams associated with each symbol of the first SSB transmission, the code when executed by the processor further causes the processor to:
perform a beam measurement operation for each transmitted first signal in each symbol of the first SSB transmission based on the associated subset of the set of first beams; and
communicate with a network entity via at least one first beam in the set of first beams based on the beam measurement operation.

* * * * *